US012592003B2

(12) United States Patent
Demoment et al.

(10) Patent No.: US 12,592,003 B2
(45) Date of Patent: Mar. 31, 2026

(54) METHODS FOR THE COMPRESSION AND DECOMPRESSION OF A DIGITAL TERRAIN MODEL FILE; ASSOCIATED COMPRESSED AND DECOMPRESSED FILES AND ASSOCIATED COMPUTER PROGRAM PRODUCT

(71) Applicant: THALES, Meudon (FR)

(72) Inventors: Ronan Yann Demoment, Toulouse (FR); Stéphane Jean-Claude Fleury, Toulouse Cedex (FR); Angélique Segretin, Toulouse (FR)

(73) Assignee: THALES, Meudon (FR)

( * ) Notice: Subject to any disclaimer, the term of this patent is extended or adjusted under 35 U.S.C. 154(b) by 273 days.

(21) Appl. No.: 18/560,926

(22) PCT Filed: May 20, 2022

(86) PCT No.: PCT/EP2022/063673
§ 371 (c)(1),
(2) Date: Nov. 15, 2023

(87) PCT Pub. No.: WO2022/243494
PCT Pub. Date: Nov. 24, 2022

(65) Prior Publication Data
US 2024/0257403 A1 Aug. 1, 2024

(30) Foreign Application Priority Data
May 21, 2021 (FR) ...................................... 2105343

(51) Int. Cl.
*G06T 9/00* (2006.01)
*G06T 9/40* (2006.01)
(52) U.S. Cl.
CPC ................ *G06T 9/001* (2013.01); *G06T 9/40* (2013.01)

(58) Field of Classification Search
None
See application file for complete search history.

(56) References Cited

U.S. PATENT DOCUMENTS

| | | | | |
|---|---|---|---|---|
| 6,317,690 B1 * | 11/2001 | Gia | ...................... | G01C 21/005 |
| | | | | 340/961 |
| 6,401,038 B2 * | 6/2002 | Gia | ...................... | G01S 13/935 |
| | | | | 701/9 |

(Continued)

OTHER PUBLICATIONS

Allerton DJ et al: "Oct-Tree Terrain Modelling Methods for Terrain Reference Navigation Systems", Aeronautical Journal, Royal Aeronautical Society, Tornbridge, GB, vol. 100, No. 991, May 1, 1996 (May 1, 1996).

(Continued)

*Primary Examiner* — Anand P Bhatnagar
(74) *Attorney, Agent, or Firm* — Soquel Group LLC

(57) ABSTRACT

Method for compressing a digital terrain model file including a tile including a matrix of cells, each cell including an elevation value for a geographical point of the terrain, by representing the tile in the form of an initial tree having a plurality of depth levels, each terminal node of the initial tree representing a zone of the tile corresponding to a single cell, pruning the initial tree so as to obtain a pruned tree, encoding the elevation value associated with each of the terminal nodes of the pruned tree to obtain a differential elevation value starting from a reference elevation, and serializing the pruned tree resulting from the encoding to obtain a compressed file indicating the reference elevation, followed by a plurality of sequences, each sequence including a header and a load, indicative of a depth level and a differential elevation value of a terminal node, respectively.

9 Claims, 5 Drawing Sheets

(56) References Cited

U.S. PATENT DOCUMENTS

| | | | | |
|---|---|---|---|---|
| 6,985,903 | B2 * | 1/2006 | Biacs ..................... | G01S 5/0236 |
| 8,665,266 | B2 * | 3/2014 | Vandrovec ............ | G06T 17/005 |
| | | | | 345/420 |
| 9,396,249 | B1 | 7/2016 | Balasubramanian | |
| 11,468,025 | B2 * | 10/2022 | Howe ...................... | G08G 5/54 |
| 11,650,969 | B2 * | 5/2023 | Howe ................. | G06F 16/2246 |
| | | | | 707/743 |
| 2001/0023390 | A1 * | 9/2001 | Gia .................... | G01C 21/3881 |
| | | | | 701/14 |
| 2011/0316854 | A1 * | 12/2011 | Vandrovec ............ | G06T 17/205 |
| | | | | 345/420 |
| 2015/0026216 | A1 * | 1/2015 | Udeshi ................ | G06F 16/2246 |
| | | | | 707/797 |
| 2021/0042281 | A1 * | 2/2021 | Howe ...................... | G08G 5/54 |
| 2022/0405258 | A1 * | 12/2022 | Howe ................. | G06F 16/2272 |
| 2024/0020968 | A1 * | 1/2024 | Haskin ................... | G06F 16/29 |
| 2024/0380414 | A1 * | 11/2024 | Lasserre ............. | H03M 7/3075 |

OTHER PUBLICATIONS

FR 2105343, INPI Rapport de Recherche Preliminaire, Feb. 4, 2022, 2 pages.
International Search Report, PCT/EP2022/063673, Aug. 30, 2022, 2 pages.
Certificate of Correction for U.S. Pat. No. 9,396,249 B1, Balasubramanian, Rajkumar.

* cited by examiner

METHODS FOR THE COMPRESSION AND DECOMPRESSION OF A DIGITAL TERRAIN MODEL FILE; ASSOCIATED COMPRESSED AND DECOMPRESSED FILES AND ASSOCIATED COMPUTER PROGRAM PRODUCT

CROSS-REFERENCE TO RELATED APPLICATIONS

This application claims benefit under 35 USC § 371 of PCT Application No. PCT/EP2022/063673 entitled METHODS FOR THE COMPRESSION AND DECOMPRESSION OF A DIGITAL TERRAIN MODEL FILE; ASSOCIATED COMPRESSED AND DECOMPRESSED FILES AND COMPUTER PROGRAM PRODUCT, filed on May 20, 2022 by inventors Ronan Yann Demoment, Stéphane Jean-Claude Fleury and Angélique Segretin. PCT Application No. PCT/EP2022/063673 claims priority of French Patent Application No. 21 05343, filed on May 21, 2021.

FIELD OF THE INVENTION

The present invention concerns the use of digital terrain model files—or DTM files. More specifically, it concerns methods for compressing/decompressing DTM files, enabling them to be used on embedded computers.

BACKGROUND OF THE INVENTION

A DTM file includes elevation data for a set of geographical points on a terrain. These points allow to construct a mesh providing a three-dimensional representation of the terrain. The terrain represented can be all or part of the Earth's surface, the ocean floor, or the surface of a celestial body other than the Earth.

The growing availability of DTM files has favored the emergence of numerous navigation or safety functions in fields such as onboard aeronautics (drones, aircraft, etc.), onboard marine or underwater navigation (surface ships, submarines, etc.), or even onboard land applications (car navigation with onboard mapping, etc.).

The resolution of a DTM file is sometimes very high. For example, the characteristic distance between two points in a DTM file may be less than 0.1", in other words less than 3 m.

The volume of data to be stored on a computer can therefore be very high, with values, for example, in excess of a hundred gigabytes for the most accurate global DTM files.

However, an avionics platform, for example, is equipped with an on-board computer, featuring a few hundred megabytes of mass memory, a few megabytes of RAM, and a single-core processor running at just a few hundred megahertz.

This is actually a consequence of the need to certify an embedded ECU before it can be used. Since certification processes are long and costly, the embedded ECUs in service belong to older generations of ECUs.

The complexity, cost and time required to develop and certify a mission-critical embedded ECU are such that it is impossible to add memory or change processors without incurring considerable costs.

It is therefore necessary to compress a source DTM file before downloading it to an embedded ECU with limited memory resources.

Furthermore, field data must be made available in real time to applications that require it, notably for critical navigation or safety functions. The on-board computer must therefore be able to decompress the compressed DTM file it stores.

However, known methods for compressing/decompressing terrain data are either insufficiently efficient in terms of compression ratio, so that the compressed DTM file still requires several gigabytes of mass memory for high-resolution global representations, or insufficiently efficient in terms of decompression speed, requiring processors running at more than one gigahertz to be able to access the decompressed data in real time.

Thus, for example, documents U.S. Pat. No. 8,665,266B2 and U.S. Pat. No. 4,890,249A disclose methods compression/decompression based on vector representations. Such methods, although effective in terms of compression, require the decoder to use complex mathematical functions (notably trigonometric functions sin, cos, etc.) to reconstitute an elevation matrix of the surrounding terrain. The use of these mathematical functions is costly in terms of performance. These methods are therefore not suitable for on-board computers.

For example, documents U.S. Pat. No. 9,462,275B2 or CN102684703A disclose compression/decompression methods based on "quad-tree" algorithms, coupled with loss compression algorithms based on space-frequency transformations (such as "wavelet" transformations), as well as encoding algorithms based on Huffman codes or CABAC codes (algorithms known to those skilled in the art). These methods are very efficient in terms of compression rates but have the drawback of being extremely greedy in terms of computing resources, both for compression as well as decompression. Processors capable of decompressing the above algorithms in real time typically run at over a gigahertz and use several hundred megabytes of RAM.

These known methods are therefore unusable on on-board computers. All the more so as these known methods do not allow a priori control of the maximum error due to compression, requiring several compression-decompression-checking cycles to be carried out in order to guarantee the maximum error.

It should be noted that the complexity of the compression method can be considerable, since it is not carried out in real-time, nor on the on-board computer, but on an external computer, which may be a latest generation, and therefore high-powered.

It is therefore necessary to find alternative compression methods allowing DTM files to be stored and decompressed without having to change the existing hardware design of the platforms.

SUMMARY OF THE DESCRIPTION

The aim of the present invention is therefore to solve this problem, by proposing an improved method for compressing DTM files, this method presenting a high compression ratio, while allowing the corresponding decompression method, executed on an on-board computer, a high decompression speed, compatible with real-time applications.

To this end, the invention has as its object a method for compressing a source DTM (digital terrain modelling) file so as to produce a compressed DTM file suitable for being stored and decompressed in real time by an on-board computer, said source DTM file including a source tile constituted of a matrix of cells, each cell including an elevation value of a geographical point of a modelled terrain, characterized in that said method includes the steps consisting of: Representing the source tile as an initial tree including a root node, intermediate nodes and terminal nodes, the initial tree having a plurality of depth levels, each node of the initial tree representing a zone of the source tile, each terminal node of the initial tree representing a zone of the tile corresponding to a single cell; Pruning the initial tree by applying a pruning criterion to obtain a pruned tree, the pruning criterion allowing, when verified, to locally limit a number of depth levels of the initial tree by stopping at an intermediate node, the intermediate node then being considered as a terminal node of the pruned tree and representing a zone of a simplified tile including a unique elevation value which is a function of the elevation values of the cells associated with the terminal nodes descending from said intermediate node and which have been pruned; Encoding the elevation value associated with each of the terminal nodes of the pruned tree to obtain a differential elevation value, the differential elevation value of a terminal node of the pruned tree being obtained from the difference between the elevation value associated with said terminal node and the elevation value associated with a previous terminal node of the pruned tree, defined in accordance with the ordering rules allowing the terminal nodes of the pruned tree to be ordered one after the other starting from a reference terminal node, the elevation value of which is taken as the reference elevation and the differential elevation value of which is equal to zero; and serializing the pruned tree resulting from the encoding to obtain the compressed DTM file by traversing the terminal nodes of the pruned tree according to a serialization order starting from the reference terminal node, the compressed DTM file including a first field indicating the reference elevation, then a plurality of sequences, each sequence comprising a header, indicative of a depth level of the terminal node under consideration, and a load, indicative of the differential elevation value of the terminal node under consideration.

Depending on particular embodiments, the method includes one or more of the following features, taken alone or in any technically possible combination:

the pruning criterion allowing to locally limit the number of depth levels of the initial tree by stopping at an intermediate node consists of checking that all the elevation values associated with the terminal nodes descending from said intermediate node are within a predefined margin of error.

the scheduling rules for encoding consist of: if a zone of the tile represented by the terminal node under consideration has at least one left-neighboring zone, the differential elevation value associated with the terminal node under consideration is calculated from the elevation value of the left-neighboring zone which is the uppermost among said at least one left-neighboring zone; if the zone of the tile represented by the terminal node under consideration has no left-neighboring zone, but does have at least one above-neighboring zone, the differential elevation value associated with the terminal node under consideration is calculated from the elevation value of the leftmost above-neighboring zone among said at least one above-neighboring zone; otherwise, the differential elevation value associated with the terminal node under consideration is calculated as a difference from the reference elevation.

the header of a sequence of a compressed DTM file is omitted when the terminal node under consideration belongs to the same depth level as the previous terminal node according to the serialization order.

the header of a sequence of a compressed DTM file is defined absolutely relative to the root node of the pruned tree or the lowest depth level of the initial tree, or in a relative manner relative to the depth level of the previous node according to the serialization order.

encoding allowing to limit a range of differential elevation values associated with the terminal nodes of the pruned tree, defines a minimum number of bits allowing to encode the differential elevation values, and the compressed DTM file including a second field indicating the minimum number of bits.

The invention also has as its object a compressed DTM file resulting from the implementation of the previous compression method.

To this end, the invention has as its object a method for the decompression of a compressed DTM file, characterized in that it includes the steps consisting of: extracting from the compressed DTM file, a bitstream corresponding to a simplified tile represented by a pruned tree; and reading a reference elevation from the first field of the bitstream; then, for each sequence of the bitstream corresponding to a terminal node of the pruned tree, starting from a reference terminal node the elevation value of which is equal to the reference elevation, until the bitstream is fully decompressed, determine a depth level from a header of the current sequence and read a differential elevation value from the load of the current sequence: calculate an elevation value from the differential elevation value read and an elevation value of a previous terminal node, defined in accordance with scheduling rules; update, with the calculated elevation value, the elevation values of the cells of a zone of the simplified tile represented by the current terminal node, in order to obtain a simplified tile cell matrix of a decompressed DTM file.

The invention also has as its object a decompressed DTM file resulting from the implementation of the previous method of the decompression.

The invention also has as its object a computer program product including instructions which, when executed by a computer, allow the implementation of the previous method of the compression or the previous method of the decompression.

The invention also has as its object a compressed DTM file following implementation of the previous method.

The invention also has as its object a method for the decompression of a compressed DTM file following implementation of the previous method.

The invention also has as object a computer program product the instructions of which, when executed by a computer, allow the implementation of the previous method of the compression or the previous method of the decompression.

BRIEF DESCRIPTION OF THE DRAWINGS

The invention and its advantages will be better understood on reading the following detailed description of a particular embodiment, given only as a non-limiting example, this description being made with reference to the appended drawings on which.

DETAILED DESCRIPTION OF EMBODIMENTS

Generally speaking, if the method for the compression according to the invention is also based on a tree representation of the source DTM file, it advantageously combines such a representation with a compression algorithm of the "delta coding" type, specifically adapted to a non-homogeneous resolution of the tree representation, in other words, a number of nodes per depth level of the tree representation that is not constant across all depth levels of the tree.

Figure 1:
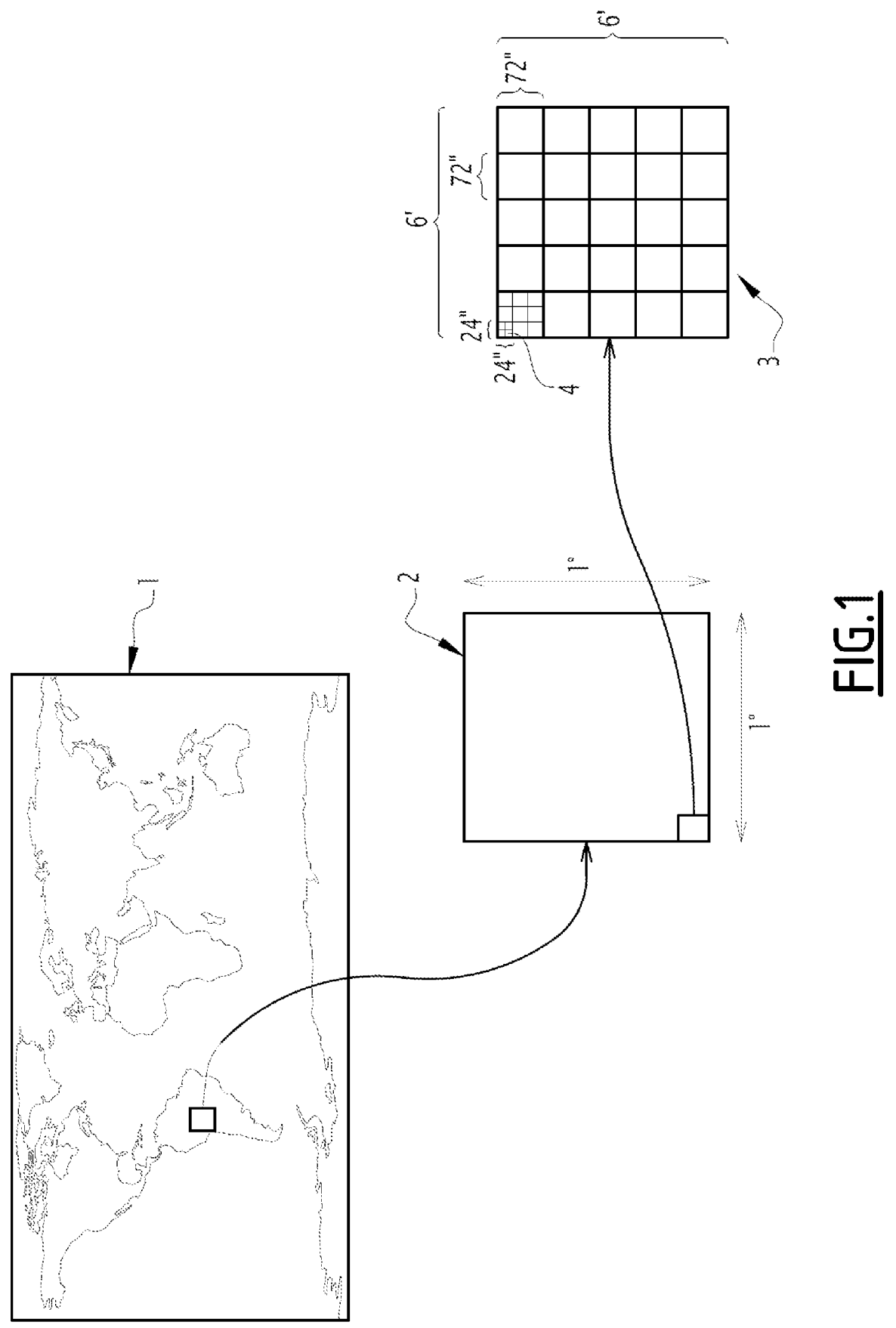
FIG. 1 illustrates the structure of a source DTM file.

In a manner known per se, as illustrated in FIG. 1, a source DTM file 1, for example a global DTM file of the Earth's surface, includes elevation values that are grouped as follows.

The Earth's surface is first subdivided into at least a first level of regions. For example, a region 2 is a square with sides of 1°. A region is oriented parallel to the Earth's meridians and parallel to the Earth's parallels.

For a high target resolution of the order of 0.1", other region levels, nested within each other, are conceivable to limit the volume of data to be handled at each region level. For example, a first-level region is subdivided into a plurality of second-level regions. A second-level region is, for example, a square with 0.25° sides. The first-level region is then subdivided into 16 second-level regions.

In the present embodiment, the target resolution is 3", so decomposition with a single region level is suitable.

Each region (or each region of the lowest region level) is then subdivided into a plurality of tiles. In the present embodiment, a tile 3 is preferably a 6′ square, in other words, a 0.1° square. A region therefore includes 100 tiles.

A tile 3 is the element of the source DTM file 1 that effectively groups together the elevation values of the zone of the Earth's surface represented by this tile.

Each tile is identified by geographic coordinates, for example a longitude coordinate and a latitude coordinate, which correspond to the coordinates of a reference point on the tile. This reference point is, for example, the lower left-hand corner of the tile.

A tile 3 is then subdivided into a plurality of cells 4.

In the preferred embodiment, a tile constituted of a matrix of 120×120 cells. A cell is then a square with 3″ sides.

A cell includes a single elevation value, which is the elevation of a central point of the zone of the Earth's surface represented by that cell.

By using 16 bit encoding for the elevation value of each cell, the volume of a tile 3 is approximately 30 kilobytes.

Figure 3:
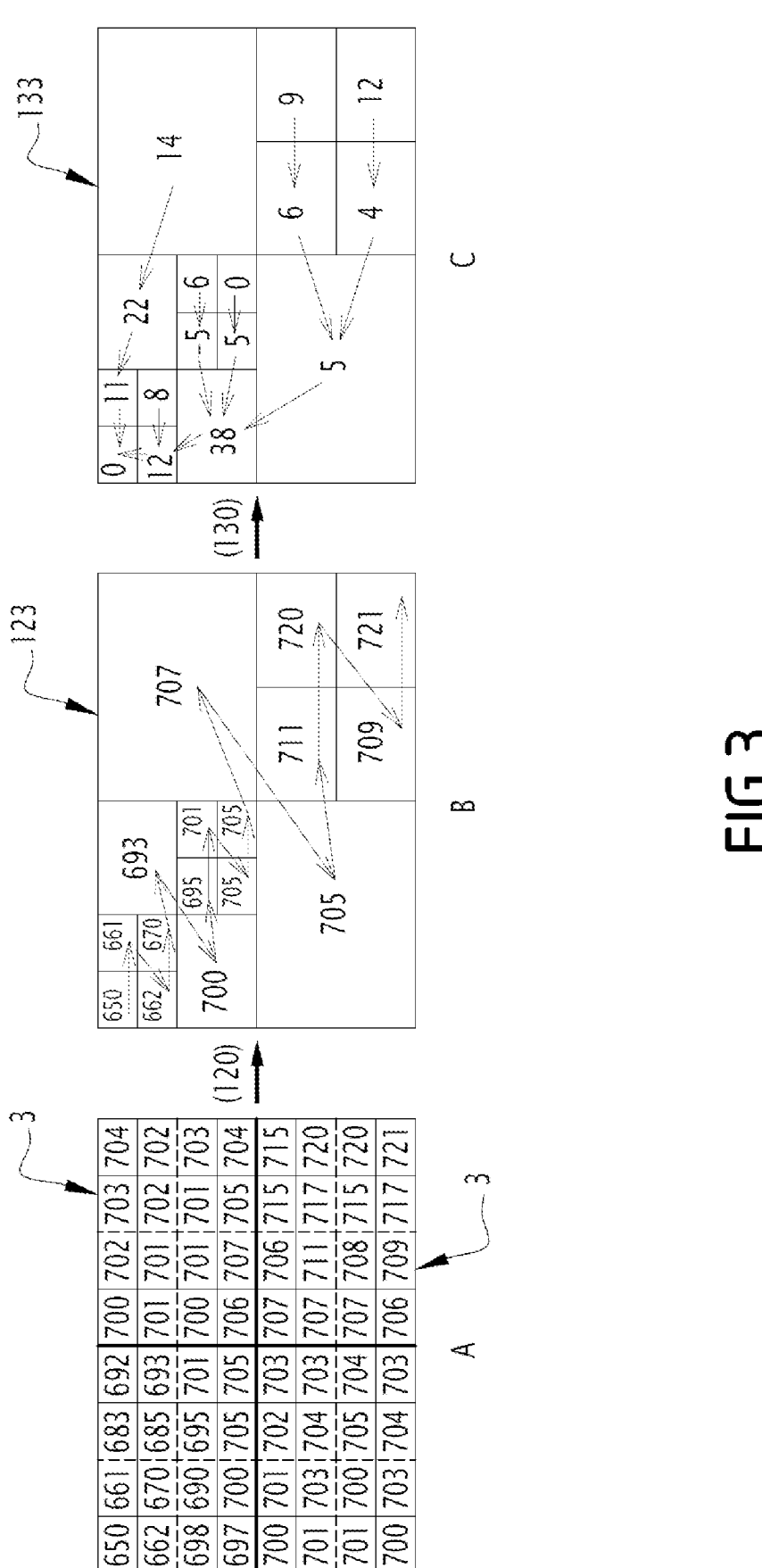
FIGS. 3A, 3B and 3C show a digital example of the implementation of the method for the compression as described in FIG. 2.
Figure 4:
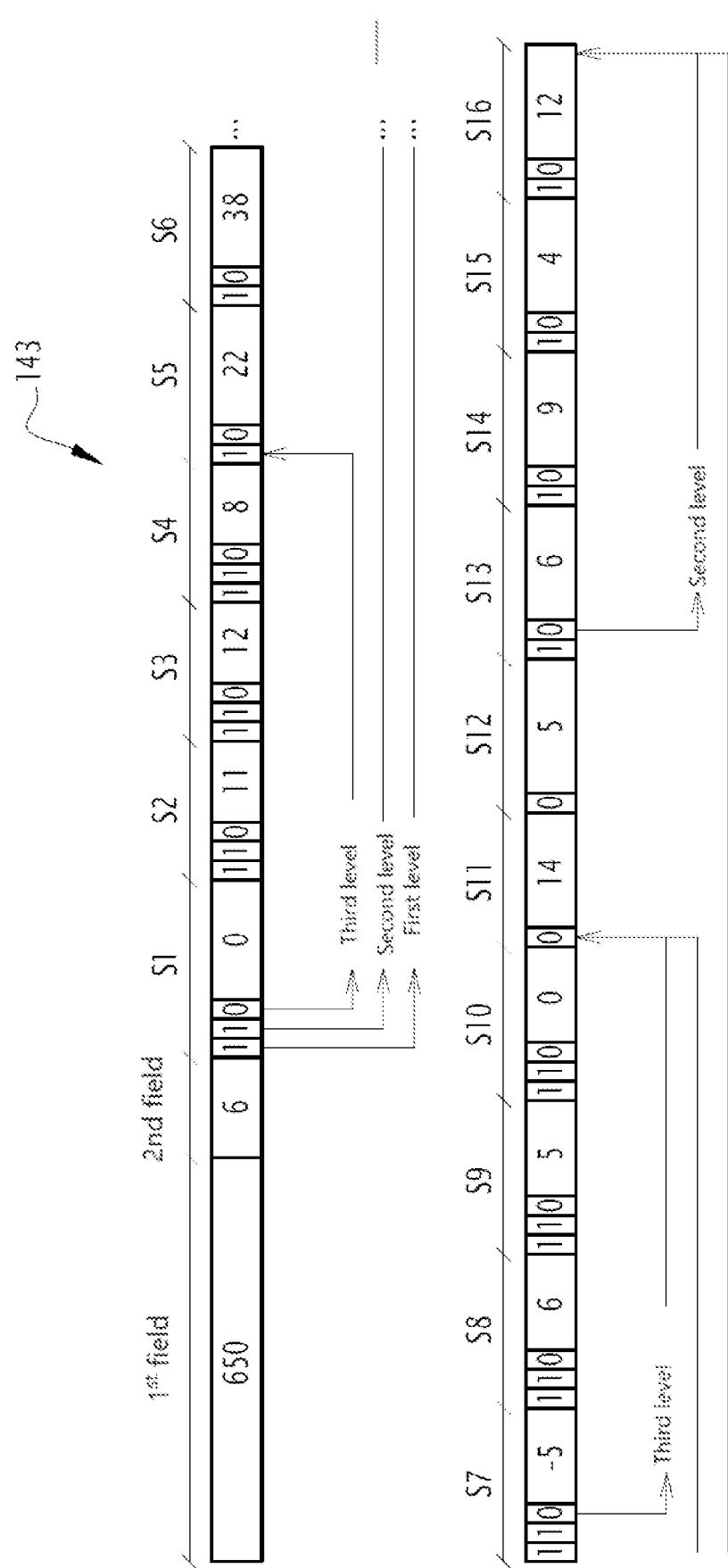
FIG. 4 is an illustration of a compressed DTM file obtained as the output of the method for the compression in FIG. 2 on the digital example in FIG. 3; and, FIG. 5 is a schematic representation of an embodiment of the method for the decompression of a compressed DTM file according to the invention.

To facilitate the description of the method according to the invention and to be able to illustrate it with figures, we consider in FIGS. 3 and 4 a simplified embodiment for which a tile consists of a matrix of 8×8 cells.

Figure 2:
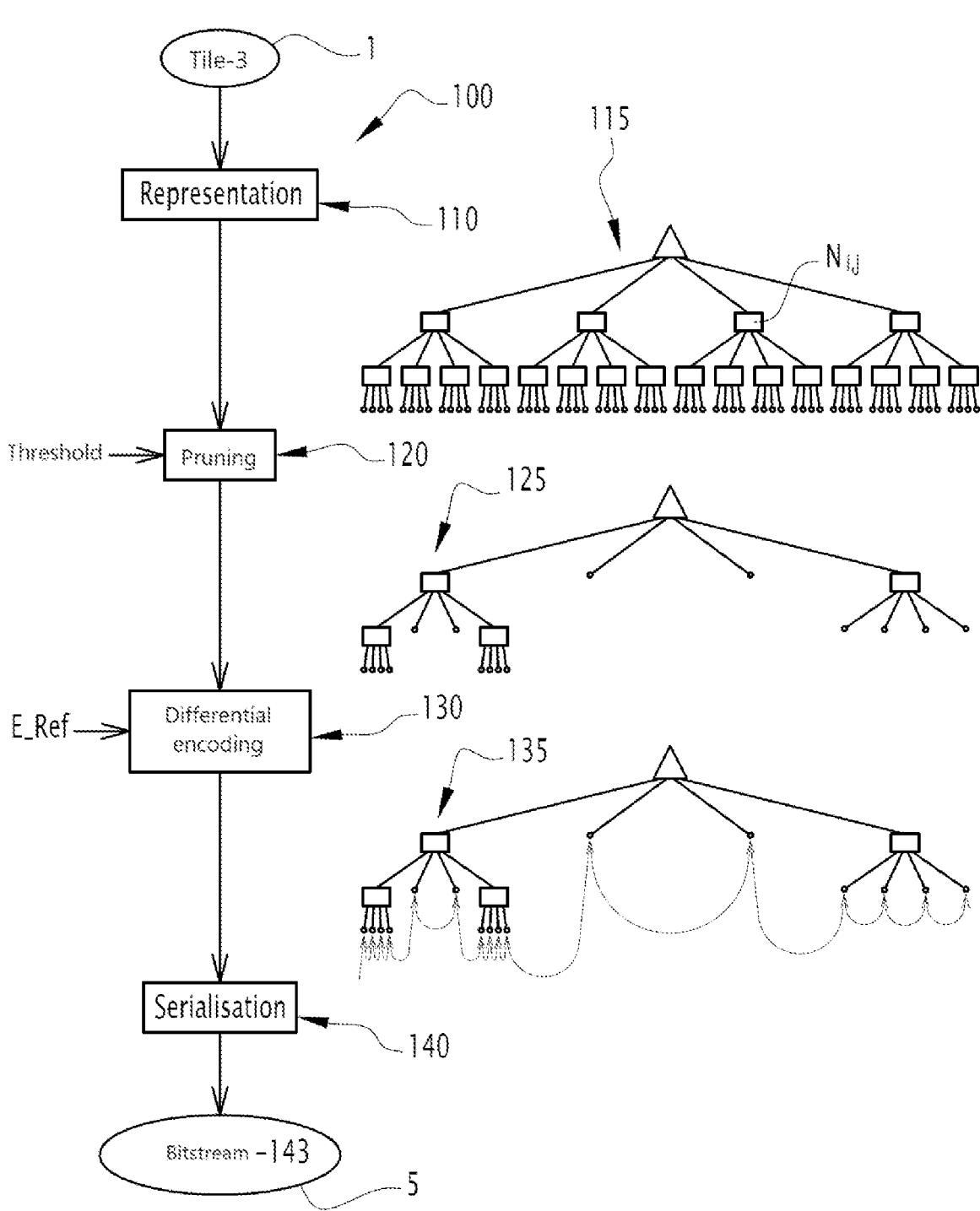
FIG. 2 is a schematic representation of an embodiment of the method for the compression of a source DTM file according to the invention.

Referring to FIG. 2, one embodiment of the method for the compression 100 for a source DTM file will be presented.

First Step

In a first step 110, a source tile 3 extracted from a source DTM file 1 is represented in the form of an initial tree 115.

Generally speaking, a graph is made up of a plurality of nodes and edges, an edge connecting two nodes together. A tree is defined mathematically as an acyclic (cycle-free) connected graph.

Put another way, the nodes of a tree are distributed over N depth levels, with the specificity that the lowest level (level 0) includes a single node, or root node, and that, for each other level, a node of depth level i (i an integer between 1 and N) is connected by only one edge, or branch, to a single node, or parent node, belonging to the previous depth level, i−1. Terminal nodes (that is, nodes with no descendants) are called leaves. Nodes other than the root node and terminal nodes are called intermediate nodes.

A node $N_{i,j}$ in the tree can be identified by two integers: the first integer i corresponds to the depth level to which this node belongs (i is therefore an integer between 0 and N); the second integer j corresponds to an identifier given to each of the nodes in the same depth level (j is therefore an integer between 1 and $N_i$, where $N_i$ is the maximum number of nodes in depth level i).

The representation of a tile 3 is an initial tree 115, which is a homogeneous tree insofar as all the terminal nodes belong to the same depth level, the lowest level N.

In the case of a tile with 120 cells per side, the tree representation does not follow that of a "quad-tree" in the strict sense, since the 120 cells number is not aligned to a power of two.

The tree representation is obtained by dividing the 120× 120 cell tile as follows:

Tile 3 is represented by the root node of the tree;

A first breakdown allows to define 5×5 first zones in tile 3: each first zone covers 24×24 cells 4 of the tile 3 and is represented by an intermediate node of the first depth level in the initial tree 115;

A second breakdown allows to define 3×3 second zones in each first zone: each second zone covers 8×8 cells and is represented by an intermediate node of the second depth level in the initial tree 115;

A third breakdown allows to define 2×2 third zones in each second zone: each third zone covers 4×4 cells and is represented by an intermediate node of the third depth level;

A fourth breakdown allows to define 2×2 fourth zones in each third zone: each fourth zone covers 2×2 cells and is represented by an intermediate node of the fourth depth level; and, A fifth breakdown allows to define 2×2 fifth zones in each fourth zone: each fifth zone is a cell of tile 3 and is represented by a terminal node of the initial tree 115.

Thus, the product of the number of nodes per depth level, 5×3×2×2×2, correctly gives the number of 120 cells for tile 3.

For the simplified embodiment of a tile 3 constituted of a matrix of 8×8 cells 4, three depth levels are sufficient, each level leading to the subdivision of the parent node into 2λ2 child nodes.

A numerical example of an 8×8 cell tile is shown in FIG. 3A. The subdivision of the tile according to the first depth level is indicated by a bold line, the subdivision according to the second depth level is indicated by a dotted line, and the subdivision according to the third depth level is indicated by a thin line (which therefore delimits the cells of the initial tree 115 representing the source tile 3).

The tree 115 representing tile 3 in FIG. 3A is the one illustrated schematically in FIG. 2. The root node corresponding to tile 3 is represented by a triangle, the terminal nodes corresponding to the cells are represented by circles, and the intermediate nodes are represented by squares.

Second Step

In a second step 120, the initial tree 115 (representing the initial tile) is pruned to obtain a pruned tree 125. The pruned tree 125 represents a simplified tile.

A zone of a tile represented by a node models a terrain surface the size of which depends on the depth level of that node. There is therefore a correspondence between the spatial resolution of a cell in a tile and the depth level of a terminal node in the tree representing this cell. Step 120 allows the local resolution of the tree representation to be adapted according to a pruning criterion.

Pruning the initial tree 115 allows the depth level of the tree representation to be limited locally by transforming an intermediate node of the initial tree 115 into a terminal node of the pruned tree 125, when the terminal nodes descending from this intermediate node in the initial tree are similar to each other, in other words, when the elevation values of the cells represented by these terminal nodes comply with a predefined pruning criterion.

In this case, by becoming a terminal node, the zone represented by this node in tile 3 becomes a cell for the tile represented by this same node in the pruned tree 125. This cell includes a single elevation value, which is a function of the elevation values of the cells represented by the terminal nodes that have been pruned.

The pruning criterion is advantageously chosen to represent the elevation error committed when it is chosen, for an intermediate node $N_{i,j}$, not to descend to subsequent depth levels and to give a single elevation value to the entire zone represented by the intermediate node $N_{i,j}$ under consideration.

For example, a pruning parameter $p_{i,j}$ is chosen as the difference between the maximum elevation value and the minimum elevation value of the cells represented by the terminal nodes originating from the intermediate node $N_{i,j}$ under consideration.

The pruning criterion is then a test on this pruning parameter $p_{i,j}$. For example, the pruning parameter $p_{i,j}$ is compared with a maximum error threshold, E_max, adjusted prior to implementation of the method for the compression 200.

In step 120, each node $N_{i,j}$ of the initial tree 115 is considered successively, starting from the root node.

When the pruning criterion is not verified for the node $N_{i,j}$ under consideration, the method moves on to the next node $N_{i,j+1}$ of the same depth level or, if all remaining nodes of depth level i have been tested, to the first remaining node of the next depth level i+1.

When the criterion is verified for node $N_{i,j}$, then all the elevation values of the cells represented by the terminal nodes originating from node $N_{i,j}$ are replaced by a single elevation value, knowing that the elevation error resulting from this simplification remains below the maximum error threshold, E_max.

The single elevation value is preferably the maximum elevation value from among the elevation values of the cells represented by the terminal nodes originating from the node $N_{i,j}$. The choice of the maximum allows to guarantee that in no case, for a same point on the Earth's surface, will the elevation value of the decompressed DTM file be lower than the elevation value of the source DTM file, so as to guarantee the security of the data supplied to an aeronautical application, for example.

FIG. 3B represents a simplified tile 123, which is the result of applying step 120 to the source tile 3 of FIG. 3A, with a pruning criterion the maximum error threshold of which is set at 10 m. The elevation value selected is the maximum elevation value of the underlying cells.

The tree 125 representing the simplified tile 123 is represented schematically in FIG. 2. The tree 125 is not necessarily homogeneous, as its terminal nodes may belong to different depth levels.

Third Step

In a third step 130, the pruned tree 125 is traversed to encode the elevation values in order to limit the amplitude of the data and allow them to be encoded on a smaller number of bits.

Encoding consists of replacing the elevation value of a cell represented by a terminal node of the pruned tree by its difference with the elevation value of a previous terminal node. This requires the terminal nodes of the pruned tree 125 to be ordered.

To do this, a reference node is first of all defined for the pruned tree 125. This is, for example, the terminal node of the pruned tree, which represents a zone covering the top left corner cell of the initial tile.

The value of the elevation of the reference node in the pruned tree is taken as the reference elevation E_Ref.

Note that the reference elevation may be different from the elevation value of the top left corner cell of the initial tile 3, when the latter has been pruned in step 120.

Then, the elevation value of the reference node is encoded by replacing it with its difference from the reference elevation E_Ref. The encoded elevation value for the reference node is therefore equal to 0.

The choice of the previous terminal node with which to encode the elevation value of a terminal node is to be precisely defined, as it must be ensured that the initial elevation values can be reconstructed, step by step, from the reference elevation E_Ref alone. Furthermore, as the structure of the pruned tree is not homogeneous (in other words, the terminal nodes do not all belong to the same depth level), this choice is not trivial.

Advantageously, the scheduling rules are as follows:

first rule: if the zone associated with the node under consideration has a neighboring zone to its left, its elevation value will be encoded from the elevation value of the node associated with this neighboring zone, (in the event that there are several neighboring zones to the left, the above neighboring zone most to the left is chosen);

second rule: if the zone associated with the node under consideration has no neighboring zone to its left, but does have a neighboring zone above it, its elevation value is encoded from the elevation value of the node associated with this neighboring zone (in the event that there are several neighboring zones above it, the above neighboring zone most to the left is chosen);

third rule: otherwise, the elevation value is encoded as a difference from the reference elevation E_Ref.

It should be noted that the first rule involves the neighboring zone to the left and that the second rule involves the above neighboring zone, since the reference cell, which is the starting point for decompression, is the cell in the upper left-hand corner of the initial tile. Choosing a different reference cell would lead to different scheduling rules.

FIG. 3C shows the encoded simplified tile 133 resulting from the application of step 130 on the simplified tile 123 of FIG. 3B. The arrows indicate the neighboring zone to the zone considered for calculating the differential elevation value.

At the end of step 130, the amplitude of the encoded differential elevation values are located within the reduced interval [0; 22]. It is therefore sufficient to use only 6 bit encoding for these values, instead of the 11 bits required to encode the elevation values of source tile 3.

Differential encoding therefore allows to reduce the amplitude of the values to be encoded, two neighboring land surfaces often having similar elevations.

Fourth Step

In a fourth step 140, the differential pruned tree 135 is serialized to obtain a stream, preferably binary, as a component of a compressed DTM file.

The binary stream is initialized with, in a first field, the reference elevation E_Ref of the tile under consideration. The reference elevation preferably uses 16 bit encoding.

Preferably, an item of information relating to the number of bits required to encode the differential elevation values is then inserted in a second field. This information uses 4 bit encoding, for example. This second field is not necessary if the number of bits required for coding is fixed in advance.

Then, a series of sequences is inserted, each sequence corresponding to a terminal node of the differential pruned tree.

A sequence is constituted of a header and a load.

The header indicates the depth level of the terminal node under consideration.

The useful load indicates the differential elevation value of the terminal node under consideration. Each elevation value is encoded using the number of bits indicated in the second field.

The series of sequences follows a predefined reading order of the terminal nodes in the tree 135. For example, the node following the node under consideration is the node that represents a zone neighboring that represented by the node under consideration in the simplified tile 133 when its cells are scanned from left to right and top to bottom, giving preference to a line break when it is possible to remain at the same level of resolution, in other words, at the same depth level as the node under consideration.

This reading order is represented by the arrows in FIG. 3B for ease of reading.

Thus, the bitstream in FIG. 4 is the result of applying step 130 to the simplified encoded tile 133 in FIG. 3C.

The bitstream includes a first field indicating the reference elevation, that is, the value 650.

The bitstream includes a second field indicating the number of bits over which the differential elevation values are encoded. Given the amplitude of these values, 6 bit encoding is used. The second field therefore indicates the value 6. This value, for example, uses 4 bit encoding.

The bitstream includes a first sequence corresponding to the reference node. In this example, this is a terminal node belonging to the third depth level. The header of the first sequence then includes a first 1-bit indicating that it is time to descend to the second depth level, then a second 1-bit indicating that that it is time to descend to the third depth level, and then a third 0-bit indicating that it is time to stop in the resolution level. As soon as a 0-bit is added, the header writing is complete and the sequence is completed with the differential elevation value of the reference node, that is, 0, which is 6 bit encoded.

The bitstream includes a second sequence corresponding to a second node, which is the node following the reference node. This is a terminal node belonging to the third depth level. The header of the second sequence then includes a first 1-bit indicating that it is time to descend to the second depth level, then a second 1-bit indicating that it is time to descend to the third depth level, then a third 0-bit indicating that it is time to stop in the resolution level. As soon as a 0-bit is added, the header writing is complete and the sequence is completed with the differential elevation value of the reference node, that is, the 6-bit value of 11.

Step by step, the entire pruned tree is traversed to obtain a bitstream of the compressed DTM file.

In an advantageous embodiment, the header does not define the depth level absolutely, but in a relative manner, taking into account the known structure of the tree.

For example, if the reference node belongs to the third depth level (as is the case in FIG. 3), it is known that it is followed by three nodes of the same depth level, so that the headers of the corresponding sequences, S2, S3 and S4, can be omitted.

Since the sequences S1 to S4 allow to describe a zone of the tile represented by a node of the second level, after the sequence S4, it is known that a zone represented by another node of the second level is to be described. Thus, the first bit of the sequence header describing this other node can be omitted.

Either this other node is terminal, in which case the header comprises a 0-bit to indicate that it is not necessary to descend to the third depth level (case of sequences S5 and S6), or this other node is not terminal, in which case the header comprises a 1-bit followed by a 0-bit to indicate that it is necessary to descend to the third depth level (case of sequences S7), The node of sequence S7 belongs to the third depth level, it is known that it is followed by three nodes of the same depth level, so that the headers of the corresponding sequences, S8 to S10, can be omitted.

The sequences S1 to S10 having allowed a zone of the tile represented by a first-level node to be described, after sequence S10, it is known that a zone represented by another first-level node will be described. Thus, the first bit of the sequence header describing this other node can be omitted.

Either this other node is terminal, in which case the header comprises a 0-bit to indicate that it is not necessary to descend to the second depth level (case of sequences S11 and S12), or this other node is not terminal, in which case the header comprises a 1-bit to indicate that it is necessary to descend to the second depth level, followed by a 0-bit, for example, to indicate that it is not necessary to continue descending (case of sequences S13).

The node of sequence S13 belongs to the second depth level, it is known that it is followed by three nodes of the same depth level, so that the headers of the corresponding sequences can be simplified by omitting the first 1-bit (case of sequences S14 to $16).

The bitstream obtained presents a high compression ratio relative to the initial tile.

The bitstream is stored in the memory of an on-board processor.

It must be decompressed to allow access to the elevation values of the pruned tree representing a decompressed simplified tile.

Figure 5:
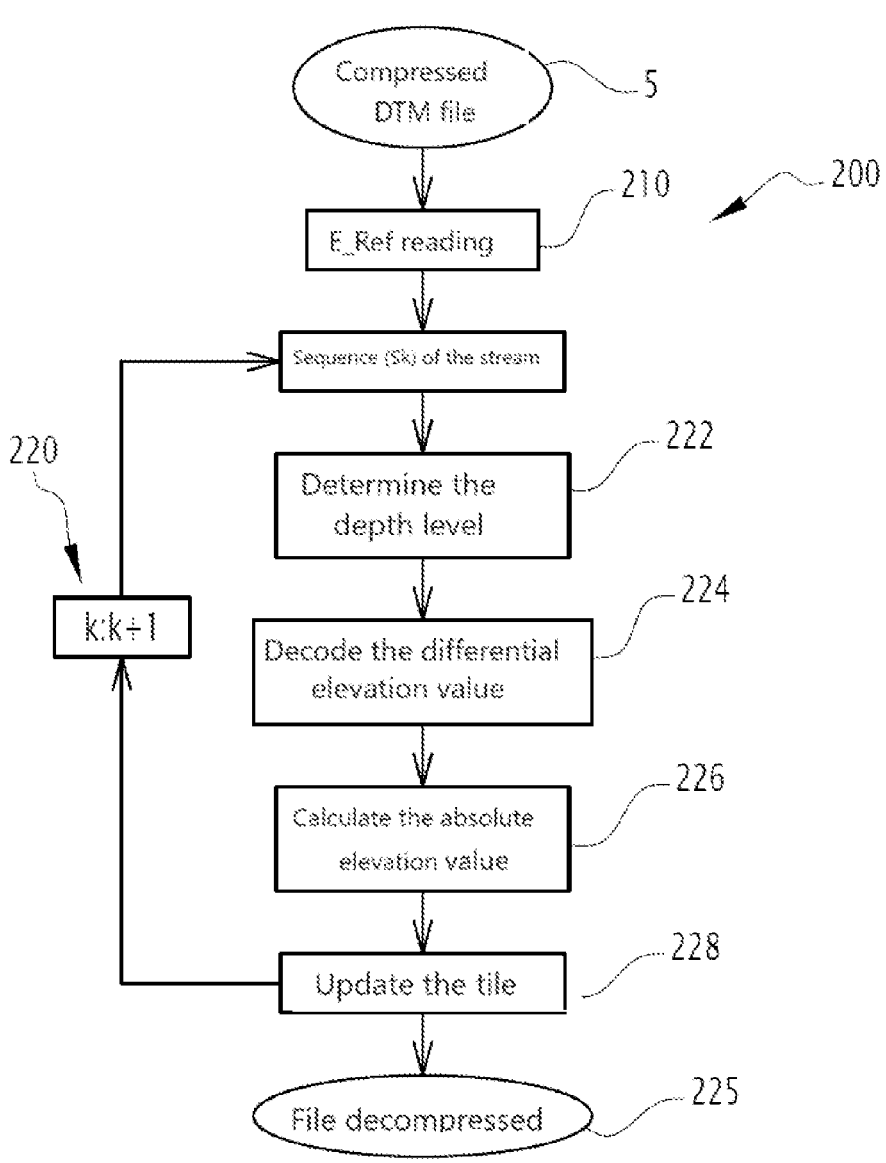

FIG. 5 illustrates an embodiment of a method for the decompression 200.

A bitstream is extracted from a compressed DTM file 5.

In a first step 210, the reference elevation information and the number of encoding bits for the differential elevation values are extracted from the bitstream.

Then, for each sequence in the bitstream (loop 220), the depth level of the current sequence is determined (step 222). This current depth is determined from the current sequence header and/or the location of the simplified tile reconstruction at the current decompression time.

Then, still for this current sequence, a differential elevation value is determined (step 224). It is decoded from the load.

Then, in step 226, an absolute elevation value is calculated from the differential elevation value, taking into account the scheduling rules used for the compression in step 120.

Finally, in step 228, the cell matrix of the simplified tile is updated by associating the zone represented by the terminal node corresponding to the current sequence of the absolute elevation value. The zone concerned is identified by taking into account the sequential order used for compression in step 140.

By repeating steps 222 to 228 for each sequence in the stream, the simplified tile is reconstructed. It constitutes all or part of the decompressed DTM file. It is represented by the pruned tree 125.

This decompressed DTM file is finally transmitted to the application that requested the decompression of the corresponding binary stream.

The person skilled in the art will note that the binary stream obtained requires only a limited number of memory accesses per encoded elevation value, as well as few and simple arithmetic operations (shift and addition). This makes decoding very fast, even on the low-power processors of embedded computers.

Thus, the method for the compression according to the invention, by coupling a tree-like representation of the terrain with a fast differential compression algorithm taking into account the maximum error constraints, allows high compression rates to be achieved while requiring little computing power and memory for decompression, and controlling the error on decompressed values.

It is therefore ideally suitable for use on low-power on-board computers, such as those found on aircraft.

In addition, the method for the compression according to the invention in addition allows, a priori, the maximum compression error to be guaranteed, making it easy to use in critical applications.

It should be noted that the pruning criterion used can be modulated so as to adapt it opportunely to zones of interest on the tile under consideration. This allows to modulate the modelling accuracy of a terrain surface according to an identified functional need.

Similarly, in order to maximize the use of memory space, it is possible to configure the maximum depth level of the pruned tree to zones of interest and thus limit the floor resolution to what is functionally sufficient.

These adaptation mechanisms help rationalize the size of the compressed DTM file for a given application.

The invention claimed is:

1. A method for compressing a digital terrain modelling (DTM) file to produce a compressed file suitable for being stored and decompressed in real time by an on-board computer, the DTM file including a tile comprising a matrix of cells, each cell of which includes an elevation value of a geographical point of a modelled terrain, the method comprising:

representing the tile in the form of an initial tree including a root node, a plurality of intermediate nodes and a plurality of terminal nodes, the initial tree having a plurality of depth levels, each node of the initial tree representing a zone of the source tile, each terminal node of the initial tree representing a zone of the tile corresponding to one cell of the matrix of cells;

pruning the initial tree by applying a pruning criterion to obtain a pruned tree, the pruning criterion allowing, when verified, to locally limit a number of depth levels of the initial tree by stopping at an intermediate node, the intermediate node then being considered as a terminal node of the pruned tree, and representing a zone of a simplified tile having a unique elevation value which is a function of the elevation values of the cells associated with the terminal nodes which descend from the intermediate node and which have been pruned;

encoding the elevation value associated with each of the terminal nodes of the pruned tree to obtain a differential elevation value, the differential elevation value of a terminal node of the pruned tree being obtained by the difference between the elevation value associated with the terminal node and the elevation value associated with a previous terminal node of the pruned tree, defined in accordance with ordering rules allowing to order the terminal nodes of the pruned tree one after the other starting from a reference terminal node, the elevation value of which is taken as the reference elevation and differential elevation value of which is equal to zero; and serializing the pruned tree resulting from the encoding to obtain the compressed file by traversing the terminal nodes of the pruned tree according to a serialization order starting from the reference terminal node, the compressed file including a first field indicating the reference elevation, then a plurality of sequences, each sequence comprising a header, indicative of a depth level of the terminal node under consideration, and a load, indicative of the differential elevation value of the terminal node under consideration.

2. The method according to claim 1, wherein the pruning criterion comprises verifying that all the elevation values associated with the terminal nodes descending from the intermediate node are within a predefined error interval.

3. The method according to claim 1, wherein the ordering rule for encoding comprises:

if a zone of the tile represented by the terminal node under consideration has at least one left-neighboring zone, the differential elevation value associated with the terminal node under consideration is calculated from the elevation value of the left-neighboring zone which is uppermost among the at least one left-neighboring zone;

if the zone of the tile represented by the terminal node under consideration has no left-neighboring zone, but does have at least one above-neighboring zone, the differential elevation value associated with the terminal node under consideration is calculated from the elevation value of the leftmost above-neighboring zone from among the at least one above-neighboring zone;

otherwise, the differential elevation value associated with the terminal node under consideration is calculated as a difference from the reference elevation.

4. The method according to claim 1, wherein the header of a sequence of a compressed file is omitted when the terminal node under consideration belongs to the same depth level as the preceding terminal node according to the serialization order.

5. The method according to claim 1, wherein the header of a sequence of a compressed file is defined in an absolute manner relative to the root node of the pruned tree or the lowest depth level of the initial tree, or in a relative manner relative to the depth level of the preceding node according to the serialization order.

6. The method according to claim 1, wherein said encoding allows to limit a range of the differential elevation values associated with the terminal nodes of the pruned tree, and to define a minimum number of bits for encoding the differential elevation values, and wherein the compressed file comprises a second field indicating the minimum number of bits.

7. A method for decompressing a compressed DTM file resulting from the method for compressing according to claim 1, the method for decompressing comprising:

extracting from the compressed DTM file a bitstream corresponding to a simplified tile represented by a pruned tree;

reading a reference elevation from the first field of the bitstream; and for each sequence of the binary stream corresponding to a terminal node of the pruned tree, starting from a reference terminal node the elevation value of which is equal to the reference elevation, until complete decompression of the binary stream:

determining a depth level from a header of the current sequence and reading a differential elevation value from the load of the current sequence;

calculating an elevation value from the differential elevation value read and an elevation value of a previous terminal node, defined according to an ordering rule; and updating, with the calculated elevation value, the elevation values of the cells of a zone of the simplified tile represented by the current terminal node, in order to obtain a matrix of cells of the simplified tile of a decompressed DTM file.

8. A computer program product comprising a non-transitory computer readable medium encoded with an information processing program for use in an information processing device, the program when executed performs the method for compression according to claim 1.

9. A computer program product comprising a non-transitory computer readable medium encoded with an information processing program for use in an information processing device, the program when executed performs the method for decompression according to claim 7.

\* \* \* \* \*